United States Patent
Sethi et al.

(10) Patent No.: US 11,775,279 B2
(45) Date of Patent: Oct. 3, 2023

(54) SYSTEM AND METHOD FOR OBTAINING A PROCESSED CLIENT INTENT DATASET BASED ON CLIENT ABSTENTION FOR AN APPLICATION UPGRADE

(71) Applicant: Dell Products L.P., Round Rock, TX (US)

(72) Inventors: Parminder Singh Sethi, Ludhiana (IN); Kanika Kapish, Muzaffarnagar (IN); Shelesh Chopra, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 138 days.

(21) Appl. No.: 17/578,030

(22) Filed: Jan. 18, 2022

(65) Prior Publication Data

US 2023/0229415 A1   Jul. 20, 2023

(51) Int. Cl.
| | |
|---|---|
| *G06F 8/60* | (2018.01) |
| *G06F 8/65* | (2018.01) |
| *G06F 16/24* | (2019.01) |
| *G06F 9/451* | (2018.01) |
| *G10L 15/16* | (2006.01) |

(52) U.S. Cl.
CPC .................. *G06F 8/65* (2013.01); *G06F 8/60* (2013.01); *G06F 16/24* (2019.01); *G06F 9/451* (2018.02); *G10L 15/16* (2013.01)

(58) Field of Classification Search
CPC . G06F 16/24; G06F 8/65; G06F 9/451; G06F 8/60; G10L 15/16; H04L 29/08
See application file for complete search history.

(56) References Cited

U.S. PATENT DOCUMENTS

| | | | |
|---|---|---|---|
| 2013/0325627 A1* | 12/2013 | Kimmerling | ........... G06F 16/24 705/14.66 |
| 2022/0188361 A1* | 6/2022 | Botros | .................... G10L 15/16 |

OTHER PUBLICATIONS

Zhu Hengshu et al., WO 2013029233, Jul. 3, 2013, 63 pgs <WO_2013029233.pdf>.*

* cited by examiner

*Primary Examiner* — Tuan A Vu
(74) *Attorney, Agent, or Firm* — Chamberlain, Hrdlicka, White, Williams, & Aughtry

(57) ABSTRACT

A method for managing a client environment includes monitoring, by an upgrade management agent, the client environment for an application abstention by a plurality of client devices of the client environment, in response to the monitoring, obtaining device configuration information corresponding to each of the plurality of client devices, performing a text pre-processing on the device configuration information to obtain pre-processed information, applying a relational analysis to the pre-processed information to obtain a normalized context reference for application abstention corresponding to the plurality of client devices, and performing a clustering algorithm on the normalized context reference to generate a processed client intent dataset.

20 Claims, 6 Drawing Sheets

SYSTEM AND METHOD FOR OBTAINING A PROCESSED CLIENT INTENT DATASET BASED ON CLIENT ABSTENTION FOR AN APPLICATION UPGRADE

BACKGROUND

Computing devices in a system may include any number of internal components such as processors, memory, and persistent storage. The computing devices may execute applications (e.g., software). Each application may be upgraded to newer versions. Users of the computing devices may decide to opt out of applying the upgrades to the applications.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing applications. Specifically, embodiments of the invention include a method and system for obtaining device configuration information corresponding to client devices in a client environment and generating, using the obtained device configuration information, a processed client intent dataset corresponding to the client devices. The processed client intent dataset may be a graphical representation of the relationship between the client devices and the reasons for an application abstention. An application abstention may refer to an opting out of applying an application upgrade to an application of the client device.

Embodiments of the invention further include methods for utilizing the processed client intent dataset to identify a set of reasons for abstaining from a new application upgrade for a client device and, based on whether a solution has been identified for each of the set of reasons. A notification is generated based on the identified solutions (or the lack thereof) to be provided to the client device.

Figure 1:
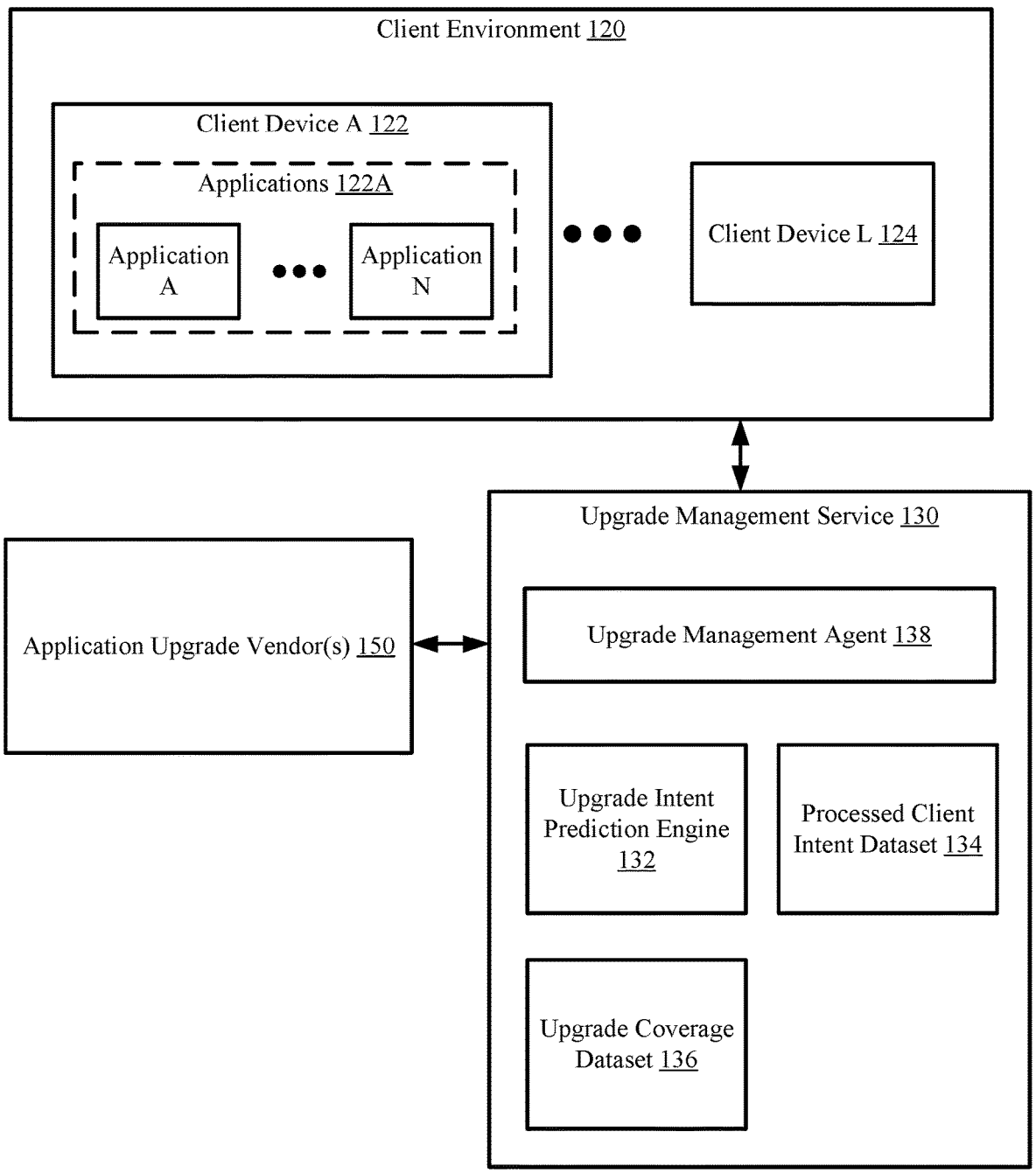
FIG. 1 shows a diagram of a system in accordance with one or more embodiments of the invention.

FIG. 1 shows an example system in accordance with one or more embodiments of the invention. The system includes a client environment (120), one or more application upgrade vendors (150), and an upgrade management service (130). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the client environment includes client devices (122, 124). Each client device (122, 124) may include applications (122A). The applications (122A) may be logical entities executed using computing resources (not shown) of the client devices (122, 124). Each of the applications may be performing similar or different processes. In one or more embodiments of the invention, the applications (122A) provide services to users, e.g., clients (not shown). For example, the applications (122A) may host components. The components may be, for example, instances of databases, email servers, operating systems, and/or other components. The applications (122A) may host other types of components without departing from the invention. An application (122) may be executed on one or more client devices (e.g., 122, 124) as instances of the application.

The applications (122A) may be upgraded based on newer versions available for installation. The installation of application upgrades may be performed and/or otherwise initiated by the client device (122). The client device (122) may obtain the application upgrades from the application upgrade vendors (150).

In one or more embodiments, a user of a client device (122) may abstain from installing an available application upgrade. For example, the application upgrade vendor (150) may send a notification for installing a new application upgrade to the client device (122). The user, via the client device (122), may decide to not install the application upgrade. The user may send a response that specifies not installing the new application upgrade. The response may include a reason for not installing the application upgrade without departing from the invention. Alternatively, the response may not include a specified reason. Throughout this disclosure, the response that specifies abstaining from installing the application upgrade may be referred to as a notification for an application abstention.

In one or more embodiments of the invention, the application upgrade may further include functionality for monitoring device configuration information of the client devices (122, 124) such as operating system information, number of applications, current versions of such applications, processing power, memory capability, storage, etc. The device configuration information may be provided to the upgrade management service (130).

In one or more embodiments of the invention, the applications (122A) are implemented as computer instructions, e.g., computer code, stored on a persistent storage that when executed by a processor(s) of a computing device cause the computing device to provide the functionality of the applications (122A) described throughout this application.

While not illustrated in FIG. 1, the system of FIG. 1 may include multiple client environments. Each client environment may operate independently from each other.

In one or more embodiments of the invention, the upgrade management service (130) provides application upgrade services. The application upgrade services may include identifying reasons for application abstention from one or more client devices (122, 124) in the client environment (120). The application upgrade services may further include providing notifications for identified solutions to previous reasons for application abstention by a client device. The upgrade management service (130) may include an upgrade management agent (138), and an upgrade intent prediction engine (132), a processed client intent dataset (134), and an upgrade coverage dataset (136). The upgrade management service (130) may include additional, fewer, and/or different components without departing from the invention.

In one or more embodiments of the invention, the upgrade management agent (138) monitors the client environment (120) to identify when a new version of an application upgrade is stored (e.g., by an application upgrade vendor (150)). The upgrade management agent (138), in response to a new application upgrade, performs the method of FIG. 2A to provide device configuration information corresponding to the client devices (122, 124) to the upgrade intent prediction engine (132). The device configuration information may correspond to a subset of the client devices (122, 124) that abstained from an application upgrade without departing from the invention.

Figure 4:
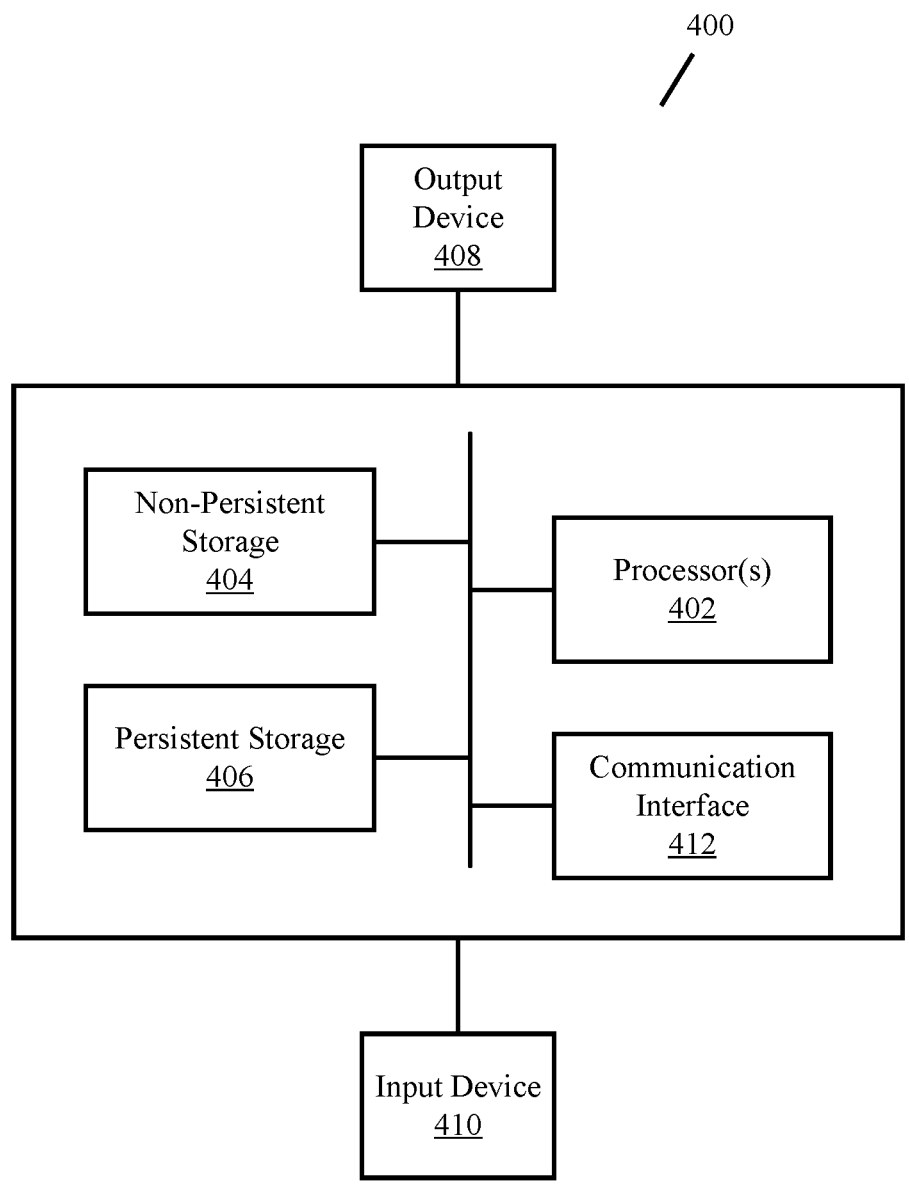
FIG. 4 shows a diagram of a computing device in accordance with one or more embodiments of the invention.

In one or more embodiments of the invention, the upgrade management agent (138) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the upgrade management agent (138) described throughout this application and/or all, or a portion thereof, of the methods illustrated in FIGS. 2A-2B.

In one or more embodiments of the invention, the upgrade management agent (138) is implemented as a logical device. The logical device may utilize the computing resources of any number of computing devices and thereby provide the functionality of the upgrade management agent (138) described throughout this application and/or all, or a portion thereof, of the methods illustrated in FIGS. 2A-2B.

In one or more embodiments of the invention, the upgrade intent prediction engine (132) performs predictions corresponding to reasons for an application abstention by one or more client devices (122, 124). Specifically, the upgrade intent prediction engine (132) may generate the processed client intent dataset (134) in accordance with FIG. 2A using the device configuration information and/or a notification of an application abstention. The processed client intent database (134) may provide information regarding the client device configuration, information regarding the user, and/or any other information without departing from the invention.

In one or more embodiments of the invention, the upgrade intent prediction engine (132) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the upgrade intent prediction engine (132) described throughout this application and/or all, or a portion thereof, of the methods illustrated in FIGS. 2A-2B.

In one or more embodiments of the invention, the upgrade intent prediction engine (138) is implemented as a logical device. The logical device may utilize the computing resources of any number of computing devices and thereby provide the functionality of the upgrade management agent (138) described throughout this application and/or all, or a portion thereof, of the methods illustrated in FIGS. 2A-2B.

In one or more embodiments of the invention, the processed client intent dataset (134) is a data structure that provides a representation of client device information and user preferences of the corresponding users. The processed client intent dataset (134) may specify an organization that relates the device configuration information of the client devices and the reasons for abstaining from previous application upgrades. The relationship between such information may be represented as, for example, a set of clusters that group client devices based on similar device configurations and/or based on similar reasons for application abstention. The clusters may be generated using a clustering algorithm performed on a normalized context reference (discussed in FIG. 2A) of the client devices (122, 124) in accordance with FIG. 2A.

In one or more embodiments of the invention, the upgrade coverage dataset (136) is a data structure that relates previous reasons for application abstention to a provided solution for potentially resolving the reason. The upgrade coverage dataset (136) may include, for example, a mapping between each potential reason as identified by an administrator of the application upgrade vendor (150) of an application upgrade and the corresponding solution determined by the administrator. For example, a reason for abstaining an application upgrade may include anxiety over the time taken for the application upgrade to complete. The upgrade coverage dataset (136) may map such reason to a solution that specifies an expected time for the new application to take.

In one or more embodiments of the invention, the upgrade management service (130) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the upgrade management service (130) described throughout this application.

In one or more embodiments of the invention, the upgrade management service (130) is implemented as a logical device. The logical device may utilize the computing resources of any number of computing devices and thereby provide the functionality of the upgrade management service (130) described throughout this application.

In one or more embodiments of the invention, the application upgrade vendor (150) is implemented as a logical device. The logical device may utilize the computing resources of any number of computing devices and thereby provide the functionality of the application upgrade vendor (150) described throughout this application.

Figure 2A:
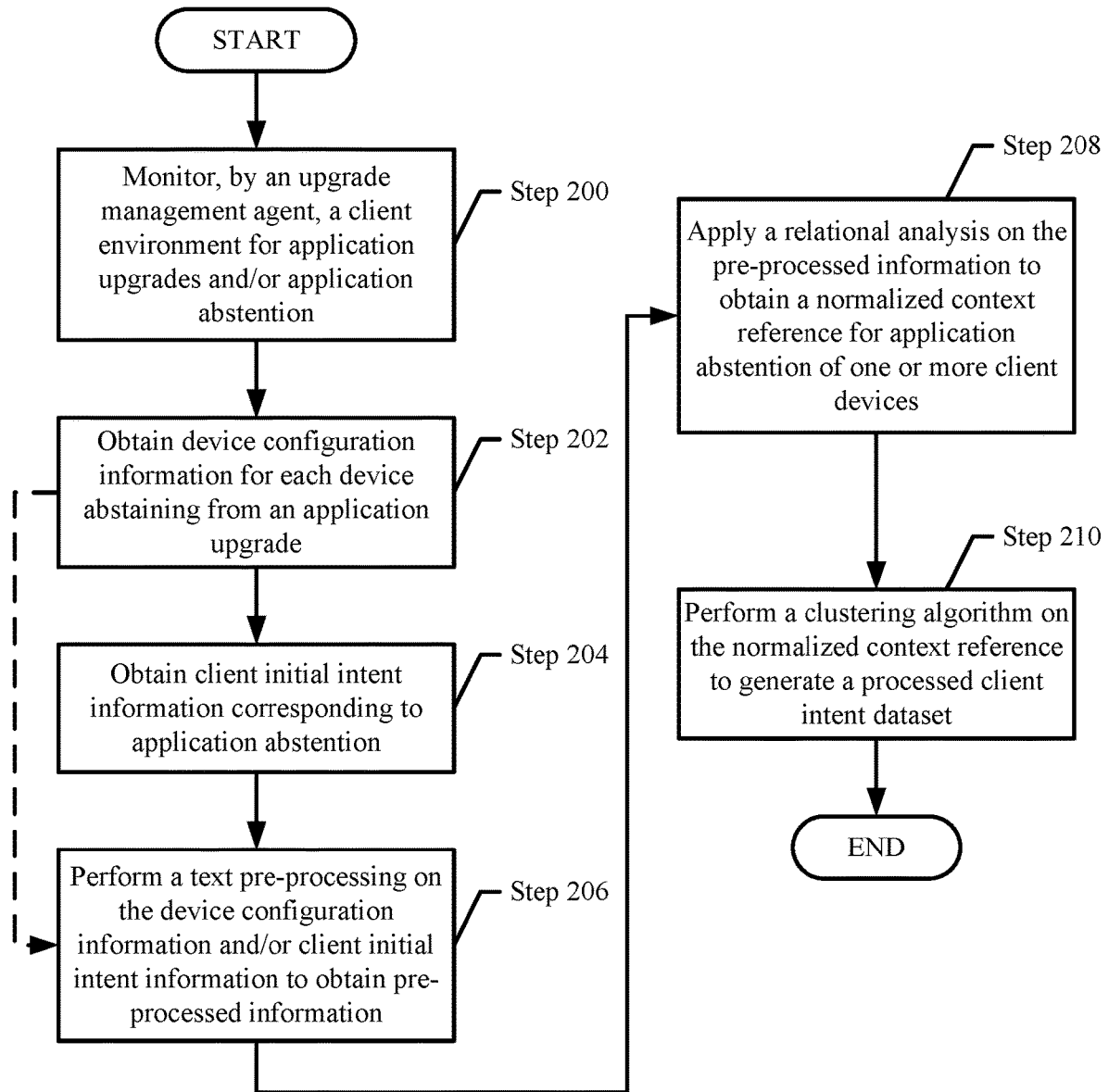
FIG. 2A shows a flowchart for obtaining a processed client intent dataset in accordance with one or more embodiments of the invention.
Figure 2B:
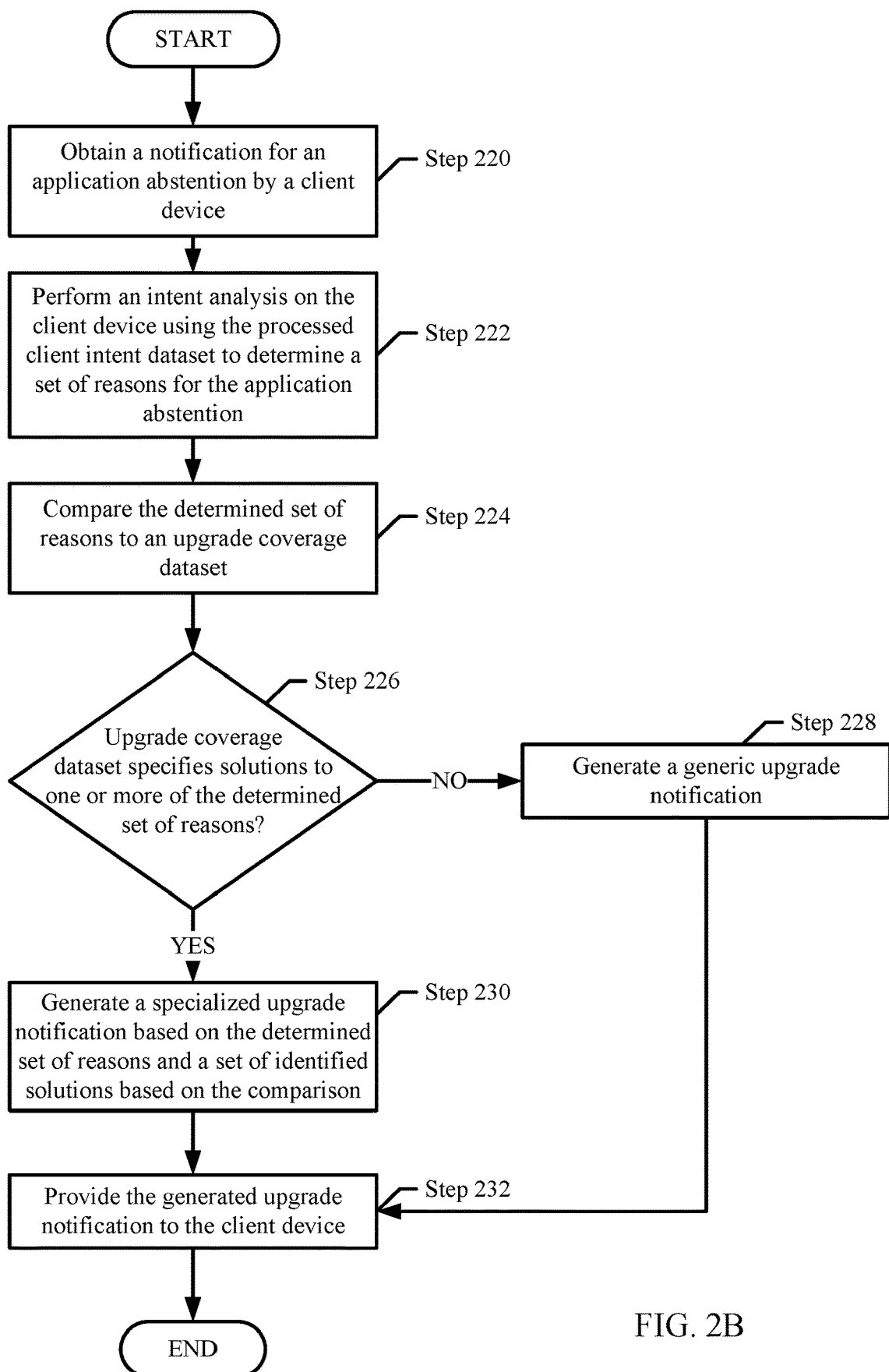
FIG. 2B shows a flowchart for providing a specialized notification based on predicted client reasons for an application abstention in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for obtaining a processed client intent dataset in accordance with one or more embodiments of the invention. The method shown in FIG. 3A may be performed by, for example, an upgrade management service (e.g., 130, FIG. 1). Other components of the system illustrated in FIG. 1 may perform the method of FIG. 2A without departing from the invention.

Turning to FIG. 2A, in step 200, the client environment is monitored for application upgrades and/or application abstention. In one or more embodiments of the invention, an upgrade management agent performs the monitoring, which includes observing the client devices to identify when an application upgrade has been provided to one or more of the application upgrades. The upgrade management agent may further monitor whether each of the client devices that were provided the application upgrade abstained from installing the application upgrades.

In step 202, device configuration information is obtained for each client device that was provided the application upgrade and/or that abstained from the application upgrade. The device configuration information, discussed above, may be obtained in response to identifying an application abstention.

In step 204, client initial intent information is obtained. In one or more embodiments of the invention, the client initial intent information is information that is provided by the client devices that specify the reasons for abstaining from the application upgrade. For example, the client initial intent information may be provided in response to a survey, which includes a set of questions relating to the reasons for abstaining to install the application upgrade, and sent to the client device. The answers to the set of questions may be answered by the users of the client devices.

In one or more embodiments of the invention, the client initial intent information is not obtained. In such embodiments, step 204 is omitted, and the method of steps 206-210 is performed on the device configuration information without the client initial intent information.

In step 206, a text pre-processing is performed on the device configuration information and/or the client initial intent information. The text pre-processing may include filtering the device configuration information to obtain a subset of the device configuration information. The subset of device configuration information may include, for example, the operating system version of the client device, the operating system type, the storage availability, and/or other information without departing from the invention. The subset of the device configuration information may be referred to as pre-processed information.

In step 208, a relational analysis is applied to the pre-processed information to obtain a normalized context reference for application abstention of one or more client devices. In one or more embodiments of the invention, the relational analysis includes applying text mining mechanisms on the pre-processed text. An example of a text mining mechanism may include a term-frequency, inverse document frequency mechanism (TF-IDF). The TF-IDF mechanism may include identifying a number of terms that a term of the device configuration information is specified in the pre-processed information and/or the frequency of a term in the pre-processed information in relation to the other terms in the pre-processed information. The terms may be, for example, the OS version, the OS type, the storage availability, and/or other information without departing from the invention.

In one or more embodiments, the relational analysis further includes performing a feature extraction on the terms of the pre-processed information to obtain pairwise distances between two terms in the pre-processed information. The pairwise distance is a measurement of the commonality between two terms of the device configuration information of a client device. For example, an OS type and an OS version of a client device may be compared for each client device to identify whether an OS type has a tendency in the client device to be utilized in a specific OS version. As another example, the OS type may be compared to the storage availability of each of the client devices to identify a relationship between OS types and storage availabilities. Other relationships between terms in the pre-processed information may be obtained without departing from the invention. The result of the relational analysis is a normalized context reference. The normalized context reference is a data structure that relates each client device to relational groups. The relational groups may include, for example, a management system classification, an upgrade context reference frame, and predicted client reason for the application abstention. The normalized context reference may be, for example, a dataset that includes entries, where each entry is associated with a client device.

In one or more embodiments, the management system classification includes system information such as, for example, the OS type, the OS version, and the storage availability. The management system classification may include the information provided in the pre-processed information. In one or more embodiments, the upgrade context reference is a grouping that includes upgrade version history, an upgrade version status (e.g., whether a previous upgrade was attempted, successful, installed, etc.), and whether an upgrade log is available. In one or more embodiments, the reasons by a client for application abstention may include a set of reasons for the client abstaining from the application upgrade.

In step 210, a clustering algorithm is performed on the normalized context reference to obtain a processed client intent dataset. In one or more embodiments, the clustering algorithm is a machine learning algorithm that relates each term of a client device to the other terms of the client devices specified in the normalized context reference to group the terms into clusters. The clustering algorithm may include comparing the terms of the normalized context reference between the client devices to determine which terms are most similar, and group the client devices between the clusters.

In one or more embodiments of the invention, the processed client intent dataset is stored in persistent storage of the upgrade management service. The upgrade management agent may utilize the processed client intent dataset to provide an upgrade recommendation for client devices that abstain from an application upgrade. Specifically, the processed client intent dataset is utilized in accordance with FIG. 2B to generate a notification to be sent to the clients abstaining from an application upgrade. The notification may include a recommendation to install the application upgrade. The notification may further include any solutions to predicted, or otherwise determined, reasons for the abstention. This may ultimately promote installation of application upgrades in a client environment.

FIG. 2B shows a flowchart for providing a specialized notification based on predicted client reasons for an application abstention in accordance with one or more embodiments of the invention. The method shown in FIG. 2B may be performed by, for example, an upgrade management service (130, FIG. 1). Other components of the system illustrated in FIG. 1 may perform the method of FIG. 2B without departing from the invention.

In step 220, a notification for an application abstention is obtained by a client device. The notification may be provided in response, by the client device, to obtaining a notification for a new application upgrade. The notification may be provided based on a message sent to the client device that specifies providing reasons for abstaining from the application upgrade. The notification may specify one or more reasons for the application abstention.

In step 222, an intent analysis is performed on the client device using the processed client intent dataset to determine a set of reasons for the application abstention. In one or more embodiments of the invention, the intent analysis includes inputting the client device into the processed client intent dataset to determine a set of reasons for the application abstention. A client device identifier of the client device may be compared to terms of the clusters of the processed client intent dataset. The intent analysis may include identifying a set of clusters to which the terms of the client device most closely resemble. The identified cluster(s) may each be associated with a reason for an application abstention. Each reason of the identified clusters may be one of the identified set of reasons.

In step 224, the determined set of reasons are compared to an upgrade coverage dataset. In one or more embodiments of the invention, the determined set of reasons are searched in the upgrade coverage data set to determine whether the upgrade coverage data set specifies a solution for any one or more of the determined set of reasons.

In step 226, a determination is made about whether the upgrade coverage dataset specifies solutions corresponding to one or more of the determined set of reasons. If the upgrade coverage dataset specifies one or more solutions corresponding to one or more of the reasons, the method proceeds to step 230; otherwise, the method proceeds to step 228.

In step 228, following the determination that the upgrade coverage dataset does not include a solution to one or more of the determine set of reasons, a generic upgrade notification is generated. The generic upgrade notification may specify the application upgrade to the client device. Further, the generic upgrade notification may specify contact information (e.g., a phone number, an email address, etc.) to an administrator of the application vendors for mediation to encourage the user to apply the application upgrade.

In step 230, following the determination that the upgrade coverage dataset includes a solution to one or more of the determined set of reasons, a specialized upgrade notification is generated based on the determined set of reasons and the set of identified solutions based on the comparison. The specialized upgrade notification is generated that specifies the determined reasons for the application abstention, and each of the identified solutions during the comparisons.

In step 232, the generated upgrade notification is provided to the client device. In one or more embodiments, the generated upgrade notification may be the generic upgrade notification of step 228 or the specialized upgrade notification of step 230.

EXAMPLE

Figure 3A:
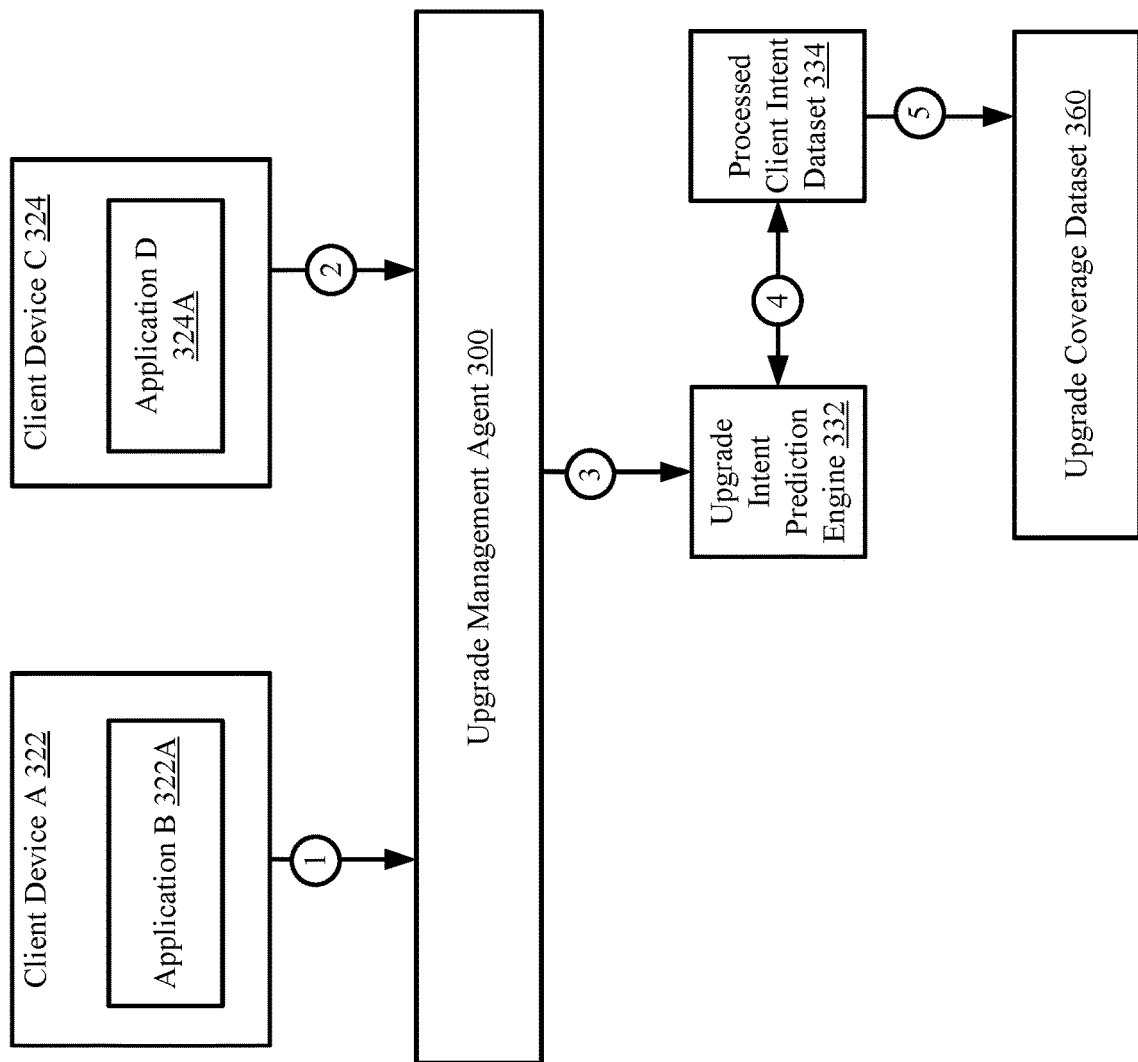
FIGS. 3A-3B show an example in accordance with one or more embodiments of the invention.
Figure 3B:
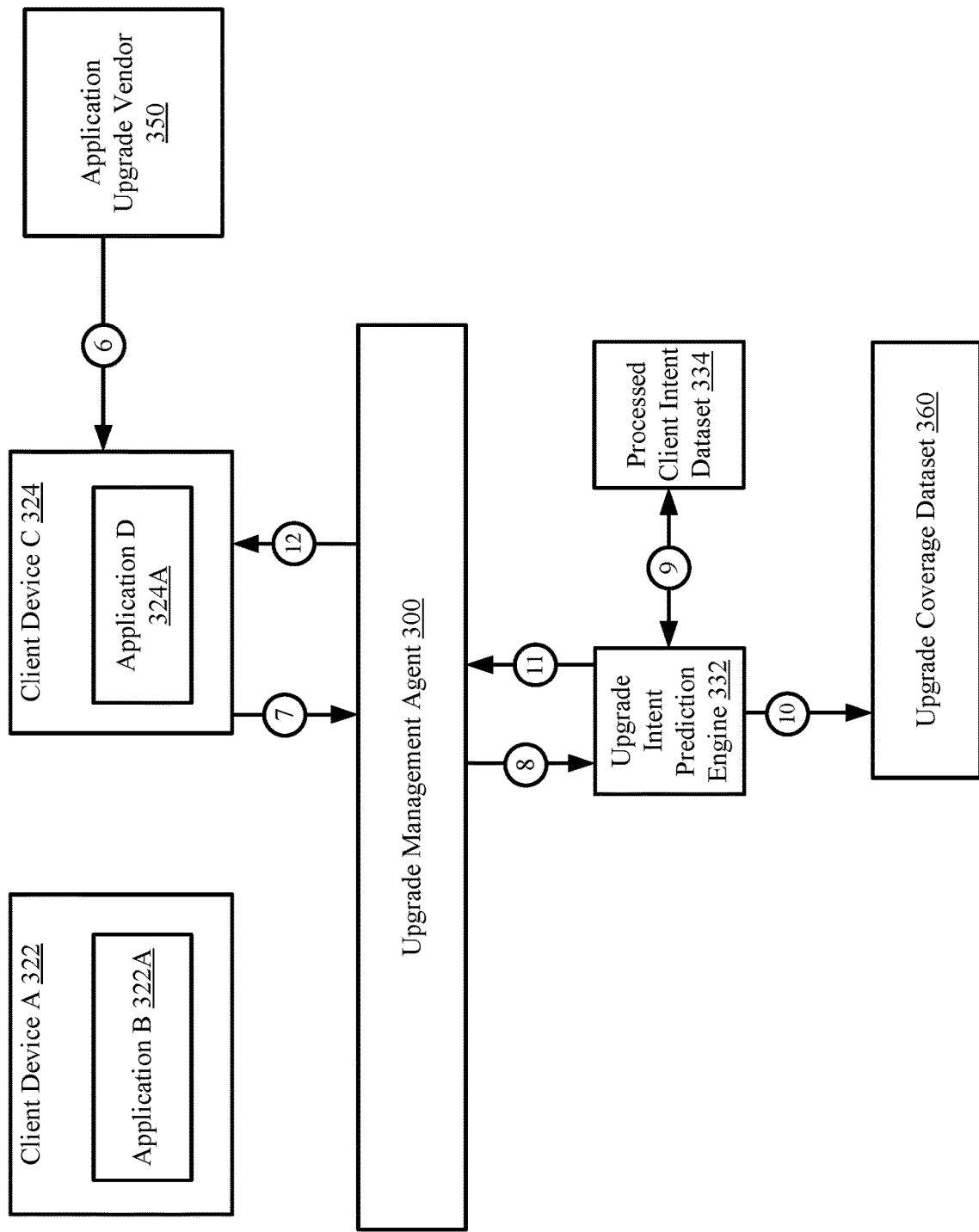

The following section describes an example. The example, illustrated in FIGS. 3A-3B, is not intended to limit the invention and is independent from any other examples discussed in this application. Turning to the example, consider a scenario in which an upgrade estimation time is performed for an application executing on two client devices.

Turning to the example, FIG. 3A shows a diagram of an example system. For the sake of brevity, not all components of the example system may be illustrated in FIG. 3A. The example system may include two client devices (client device A (322) and client device C (324)). Client device A (322) executes application B (322A) on version 1.1.0, and client C (324) executes application D (324A), also on version 1.1.0. For clarity, each of the applications (322A, 324A) may be instances of the same application. Both users of client devices A and C (322, 324) have abstained from installing application upgrades for version 1.2.0.

An upgrade management agent (300) obtains device configuration information from each of client device A (322) [1] and client device C (324) [2]. The upgrade management agent (300) stores configuration files each corresponding to the device configuration information of client devices A (322) and provides them to the upgrade intent prediction engine (332) [3].

The upgrade intent prediction engine (332) performs the method of FIG. 2A to generate the processed client intent dataset (334) [4]. Specifically, the upgrade intent prediction engine (332) generates a normalized context reference using the obtained configuration files. The normalized context reference includes entries that each specify terms of the configuration details of the client devices. The terms include the operating system type of the client devices (322, 324), the operating system version, the available data for each client device (322, 324), the upgrade history of the client devices, whether a previous attempt at an upgrade was successful, and, if any, specified reasons for abstaining from the most recent application upgrade. The aforementioned terms are used to group the terms into clusters based on similarity between the client devices. The clusters are specified in the processed client intent dataset (334). Further, the processed client intent dataset is used to generate the upgrade coverage dataset (360) [5]. The upgrade coverage dataset (360) specifies a set of reasons for potentially abstaining from an application upgrade and a potential solution that may encourage a user to install a future application upgrade.

FIG. 3B shows a diagram of the system at a later point in time. For the sake of brevity, not all components of the example system may be illustrated in FIG. 3B. An application upgrade vendor (350) provides a new application upgrade to client device C (324) [6]. Currently, version 1.1.0 is installed on application D (324A). The application upgrade is for a newer version of application D (324A). The new application upgrade is for version 1.3.0. The user of client device C (324) decides to abstain from the new application upgrade. The client device (324) sends a notification of the application abstention to the upgrade management agent (300) [7]. The notification does not specify any reason for the application abstention. The upgrade management agent (300) provides the notification to the upgrade intent prediction engine (332) [8].

After obtaining the notification, the upgrade intent prediction engine (332) inputs a client identifier of client device C (324) to the processed client intent dataset (334) to determine similar clusters of the client device. The identified clusters are each associated with a reason for application abstention. The upgrade intent prediction engine (332), based on the identified clusters, determines a set of reasons for client device C (324) abstaining from the new application upgrade. These determined set of reasons include a failure in installing the previous version (i.e., 1.2.0) of the application upgrade and anxiety over an undetermined period of time required to complete the application upgrade.

In one or more embodiments, the determined set of reasons are compared to the upgrade coverage dataset (360), which includes a comprehensive list of reasons for not installing the application upgrade that have been addressed by administrators of the application upgrade vendor (350). The addressing of the reasons are referred to as solutions. The determined set of reasons associated with client device C (324) are compared to obtain a set of solutions corresponding to the determined reasons [10]. The solutions associated with the determined set of reasons include specifying that all requirements for the installation are included in the application upgrade, thus reducing the possibility of a failure. The solutions further include a specified time required for the application upgrade to be completed, thus reducing the anxiety caused by an uncertainty of the user for the time required.

The upgrade intent prediction engine (332), in response to obtaining the solutions for the determined set of reasons, sends a specialized upgrade notification to the upgrade management agent (300) [11] to be provided to the client device (324) [12]. The specialized upgrade notification includes the determined set of reasons and the identified set of solutions to reduce the likelihood of another application abstention. The user operating the client device (324), in response to obtaining the specialized upgrade notification, reconsiders the abstention and decides to install the application upgrade.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the use of computing devices that reduce the anxiety of users in a client environment that causes application abstention. The anxiety may be reduced by providing the users with information that may encourage the users to install application upgrades. The information may be generated by monitoring the clients to identify the device configuration information and/or any client initial intent information corresponding to the reasons provided by the client device.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a client environment, comprising:
   monitoring, by an upgrade management agent, the client environment for an application abstention by a plurality of client devices of the client environment;
   in response to the monitoring, obtaining device configuration information for the plurality of client devices;
   performing a text pre-processing on the device configuration information to obtain pre-processed information;
   applying a relational analysis to the pre-processed information to obtain a normalized context reference for application abstention corresponding to the plurality of client devices;

performing a clustering algorithm on the normalized context reference to generate a processed client intent dataset; and storing the processed client intent dataset, wherein the processed client intent dataset is used to provide an upgrade recommendation for at least one of the plurality of client devices.

2. The method of claim 1, further comprising:

obtaining, from a subset of the plurality of client devices, client initial intent information corresponding to the application abstention from an application upgrade;

wherein the text pre-processing is further performed on the client initial intent information.

3. The method of claim 2, wherein the client initial intent information specifies a reason, by a client device of the subset of the plurality of client devices, for abstaining from an application upgrade.

4. The method of claim 1, wherein the normalized context reference comprises a management system classification, an upgrade context reference frame, and a predicted client reason for application abstention.

5. The method of claim 1, wherein the client environment obtains an application upgrade from an application upgrade vendor.

6. The method of claim 1, wherein applying the relational analysis to the pre-processed information comprises:

applying a text mining mechanism on the pre-processed information to identify a set of terms of the pre-processed information; and performing a feature extraction on the set of terms of the pre-processed information to obtain the normalized context reference.

7. The method of claim 1, wherein performing the text pre-processing comprises:

filtering the device configuration information to obtain a subset of the device configuration information, wherein the subset of the device configuration information comprises at least one of: an operating system of each of the plurality of client devices, an operating system version of each of the plurality of client devices, and a storage availability of each of the plurality of client devices.

8. A non-transitory computer readable medium comprising computer readable program code, which when executed by a computer processor enables the computer processor to perform a method for managing a client environment, the method comprising:

monitoring, by an upgrade management agent, the client environment for an application abstention by a plurality of client devices of the client environment;

in response to the monitoring, obtaining device configuration information for the plurality of client devices;

performing a text pre-processing on the device configuration information to obtain pre-processed information;

applying a relational analysis to the pre-processed information to obtain a normalized context reference for application abstention corresponding to the plurality of client devices;

performing a clustering algorithm on the normalized context reference to generate a processed client intent dataset; and storing the processed client intent dataset, wherein the processed client intent dataset is used to provide an upgrade recommendation for at least one of the plurality of client devices.

9. The non-transitory computer readable medium of claim 8, the method further comprising:

obtaining, from a subset of the plurality of client devices, client initial intent information corresponding to the application abstention from an application upgrade;

wherein the text-preprocessing is further performed on the client initial intent information.

10. The non-transitory computer readable medium of claim 9, wherein the client initial intent information specifies a reason, by a client device of the subset of the plurality of client devices, for abstaining from an application upgrade.

11. The non-transitory computer readable medium of claim 8, wherein the normalized context reference comprises a management system classification, an upgrade context reference frame, and a predicted client reason for application abstention.

12. The non-transitory computer readable medium of claim 8, wherein the client environment obtains an application upgrade from an application upgrade vendor.

13. The non-transitory computer readable medium of claim 8, wherein applying the relational analysis to the pre-processed information comprises:

applying a text mining mechanism on the pre-processed information to identify a set of terms of the pre-processed information; and performing a feature extraction on the set of terms of the pre-processed information to obtain the normalized context reference.

14. The non-transitory computer readable medium of claim 8, wherein performing the text pre-processing comprises:

filtering the device configuration information to obtain a subset of the device configuration information, wherein the subset of the device configuration information comprises at least one of: an operating system of each of the plurality of client devices, an operating system version of each of the plurality of client devices, and a storage availability of each of the plurality of client devices.

15. A system comprising:

a client environment comprising a plurality of client devices;

an upgrade management service;

wherein the upgrade management service is programmed to:

monitor the client environment for an application abstention by the plurality of client devices;

in response to the monitoring, obtain device configuration information corresponding to each of the plurality of client devices;

perform a text pre-processing on the device configuration information to obtain pre-processed information;

apply a relational analysis to the pre-processed information to obtain a normalized context reference for application abstention corresponding to the plurality of client devices; and perform a clustering algorithm on the normalized context reference to generate a processed client intent dataset; and store the processed client intent dataset, wherein the processed client intent dataset is used to provide an upgrade recommendation for at least one of the plurality of client devices.

16. The system of claim 15, wherein the upgrade management service is further programmed to:

obtain, from a subset of the plurality of client devices, client initial intent information corresponding to the application abstention from an application upgrade, wherein the text-preprocessing is further performed on the client initial intent information.

17. The system of claim 16, wherein the client initial intent information specifies a reason, by a client device of the subset of the plurality of client devices, for abstaining from an application upgrade.

18. The system of claim 15, wherein the normalized context reference comprises a management system classification, an upgrade context reference frame, and a predicted client reason for application abstention.

19. The system of claim 15, wherein applying the relational analysis to the pre-processed information comprises:
applying a text mining mechanism on the pre-processed information to identify a set of terms of the pre-processed information; and
performing a feature extraction on the set of terms of the pre-processed information to obtain the normalized context reference.

20. The system of claim 15, wherein performing the text pre-processing comprises:
filtering the device configuration information to obtain a subset of the device configuration information,
wherein the subset of the device configuration information comprises at least one of: an operating system of each of the plurality of client devices, an operating system version of each of the plurality of client devices, and a storage availability of each of the plurality of client devices.

* * * * *